(12) United States Patent
Keller et al.

(10) Patent No.: US 6,551,543 B1
(45) Date of Patent: Apr. 22, 2003

(54) METHOD AND DEVICE FOR PRODUCING A TWO-CHAMBER TUBE

(75) Inventors: Gerhard Keller, Jongny (CH); Jean-Pierre Voigtmann, Martigny (CH)

(73) Assignee: Aisa Automation Industrielle SA, Vouvry (CH)

( * ) Notice: Subject to any disclaimer, the term of this patent is extended or adjusted under 35 U.S.C. 154(b) by 0 days.

(21) Appl. No.: 09/936,777

(22) PCT Filed: Mar. 15, 2000

(86) PCT No.: PCT/EP00/02291

§ 371 (c)(1),
(2), (4) Date: Sep. 17, 2001

(87) PCT Pub. No.: WO00/54963

PCT Pub. Date: Sep. 21, 2000

(30) Foreign Application Priority Data

Mar. 16, 1999 (DE) .......................................... 199 11 729

(51) Int. Cl.$^7$ ................................................. H05B 6/00
(52) U.S. Cl. ........................ 264/478; 264/250; 264/263; 264/266; 264/268; 264/275; 264/277; 264/278; 264/319; 425/121; 425/123; 425/126.1; 425/129.1; 425/393
(58) Field of Search ................................. 264/248, 249, 264/250, 255, 263, 266, 268, 275, 277, 278, 279, 318, 319, 478; 425/121, 123, 126.1, 129.1, 392, 393

(56) References Cited

U.S. PATENT DOCUMENTS

| | | | | |
|---|---|---|---|---|
| 3,706,519 A | * | 12/1972 | Soethje ........................ 264/322 |
| 4,021,524 A | * | 5/1977 | Grimsley ..................... 264/242 |
| 4,065,536 A | * | 12/1977 | Lucas ......................... 215/382 |
| 4,166,555 A | * | 9/1979 | Cheetham .................... 206/537 |
| 4,474,719 A | | 10/1984 | Sander |
| 4,518,554 A | * | 5/1985 | Hatakeyama et al. ......... 249/59 |
| 5,102,915 A | | 4/1992 | Ball et al. ..................... 222/145 |
| 5,219,373 A | * | 6/1993 | Hatakeyama et al. ........ 264/250 |
| 5,292,034 A | * | 3/1994 | Keller ......................... 222/107 |
| 5,705,112 A | * | 1/1998 | Gram .......................... 264/242 |
| 6,082,588 A | * | 7/2000 | Markey et al. .............. 222/135 |
| 6,210,621 B1 | * | 4/2001 | Usen et al. .................. 264/263 |

FOREIGN PATENT DOCUMENTS

| | | |
|---|---|---|
| DE | 28 42 515 | 9/1978 |
| DE | 196 40 833 | 12/1997 |
| DE | 197 12 736 | 11/1998 |

\* cited by examiner

*Primary Examiner*—Angela Ortiz
(74) *Attorney, Agent, or Firm*—Collard & Roe

(57) ABSTRACT

The invention relates to a method for producing a two-chamber tube with a dividing wall (9) that extends into the tube head. This method comprises the following steps: a) inserting a dividing wall (9) into the gap (8) of an auxiliary mandrel (6); b) sliding a prefabricated tube pipe body (11) onto said auxiliary mandrel (6), which has been fitted with the dividing wall (9); c) axially transferring the blank (12) produced in step b) from the auxiliary mandrel (6) onto a pressing mandrel (2); d) adding a molten portion of a plastic material in a female mold (3); e) conveying the pressing mandrel (2) with the blank (12) into the female mold (3) with the portion of a plastic material in an axial position, in order to mold a tube head onto the blank (12); f) pressing the material portion between the pressing mandrel 92) and the female mold (3) in order to form a tube head, at the same time producing a solid connection with the pipe body (11) and with the section of the dividing wall (9) that is located in the area of the tube head by closing the mold; g) opening the mold, removing the pressing mandrel (2) and withdrawing the finished two-chamber tube. The invention also relates to a device for carrying out the method.

10 Claims, 4 Drawing Sheets

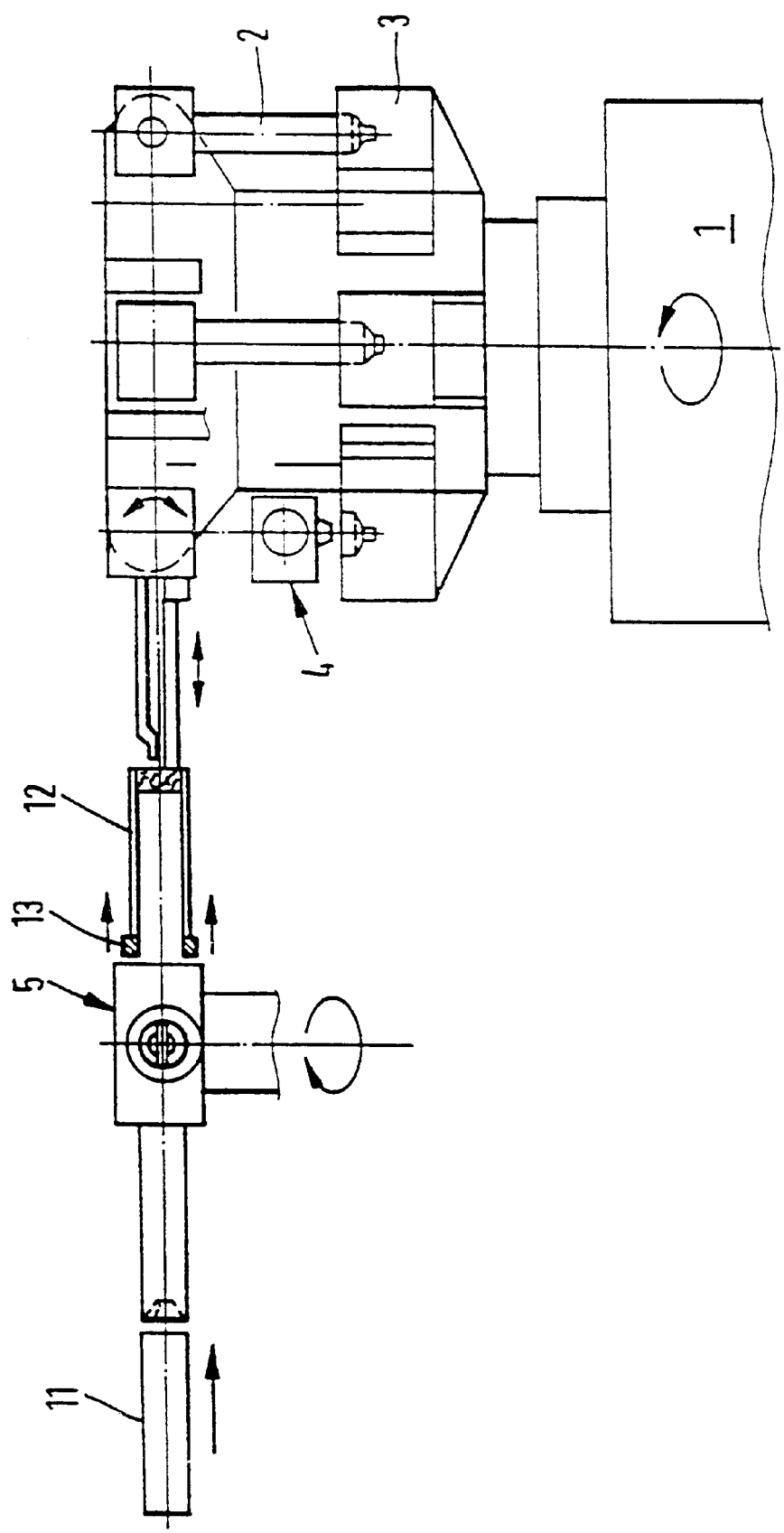

METHOD AND DEVICE FOR PRODUCING A TWO-CHAMBER TUBE

CROSS REFERENCE TO RELATED APPLICATIONS

Applicants claim priority under 35 U.S.C. §119 of German Application No. 199 11 729.2 filed Mar. 16, 1999. Applicants also claim priority under 35 U.S.C. §120 of PCT/EP00/02291 filed Mar. 15, 2000. The international application under PCT article 21(2) was not published in English.

BACKGROUND OF THE INVENTION

The invention relates to a process for producing a dual chamber tube and to an apparatus for carrying out the process.

1. Field of the Invention

Processes and apparatuses of this type are known, for example, from DE-C1-196 40 833 and from DE-C1-197 12 736.

2. The Prior Art

With the process known from DE 197 12 736 using the apparatus described therein, a partition has to be introduced into a narrow sharp-edged slot in a single-part mandrel, and this can lead to considerable problems, particularly in the case of thin partitions. The performance of the apparatus is greatly restricted as both the production of a tube body with partition and the moulding-on of a tube head which involves cooling times take place in the same apparatus, and different periods of time which affect the rate to be maintained are required in each case.

A two-part pressing mandrel of which the parts are displaceable relative to one another is used with the process known from DE 196 40 833 and the associated apparatus, so the insertion of a tube body provided with a partition is simplified.

SUMMARY OF THE INVENTION

It is an object of the invention to provide a process and an apparatus for producing dual chamber tubes which allows a high speed and a reliable, simple supply of partitions for producing prefabricated tube bodies provided with a partition, in the form of blanks, and the conveyance thereof onto a pressing mandrel and into a mould for the moulding-on of a tube head.

This object is achieved with a process having the features of claim 1 and an apparatus having the features of claim 5.

The associated sub-claims relate to advantageous developments of the invention.

BRIEF DESCRIPTION OF THE DRAWINGS

The invention will be described in more detail hereinafter by means of an apparatus for carrying out the process with reference to the figures, in which:

FIG. 2 is a side view of the apparatus according to FIG. 1;

DETAILED DESCRIPTION

Figure 1:
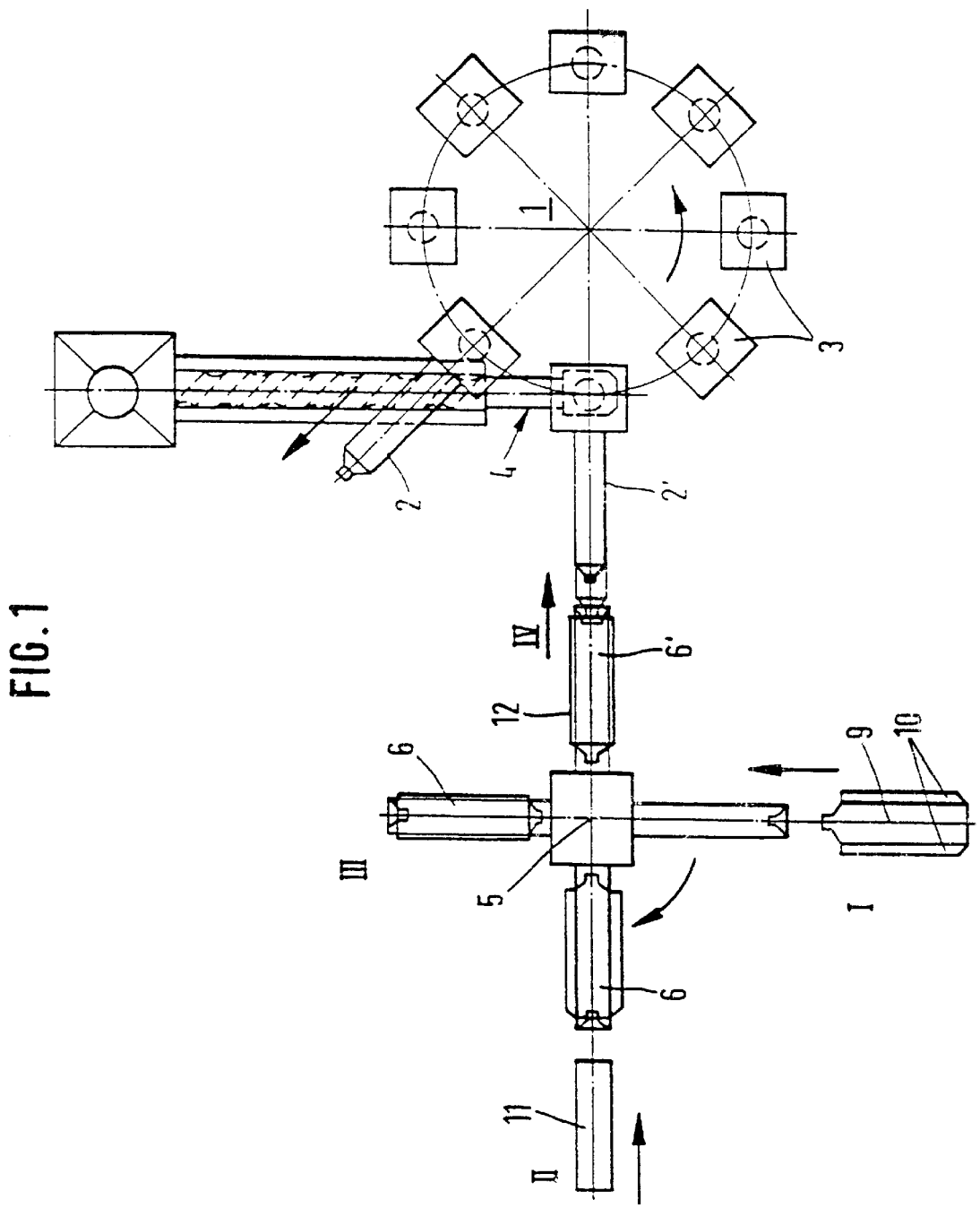
FIG. 1 is a plan view of an apparatus for producing dual chamber tubes.

The apparatus shown in FIGS. 1 and 2 comprises a turntable 1 which is driven intermittently with pivotal pressing mandrels 2 of the type described, for example, in DE-AS 28 42 515, distributed round the periphery. Each pressing mandrel 2 is arranged so as to pivot into a horizontal and a vertical position. In its vertical position each pressing mandrel 2 is associated with an axially aligned mould 3 on the turntable 1, pressing mandrel 2 and mould 3 being arranged movably relative to one another in their axial alignment to perform a pressing operation. One mould 3 of the turntable 1, preferably in a position where the corresponding pressing mandrel 2 is guided horizontally, is associated with a supply station 4 for delivering a portion of a molten plastics material into the mould 3. The supply station can comprise an extruder and a dispenser.

A hub 5 is arranged so as to rotate intermittently in an axial direction relative to a pressing mandrel 2' located in a horizontal position. The hub 5 carries auxiliary mandrels 6 which preferably but not necessarily each consist of two auxiliary mandrel parts 7, 7' and have a gap 8 into which a partition 9 in the form of a cut-to-size piece can be inserted. In the embodiment, four auxiliary mandrels 6 distributed uniformly round the periphery of the hub 5 are arranged in a horizontal and axial orientation perpendicular to the axis of rotation of the hub 5. Each auxiliary mandrel 6 axially aligned in a position on its path round the hub 5 is associated with a pressing mandrel 2 of the turntable 1, the respective free ends of auxiliary mandrel 6 and pressing mandrel 2' being spaced only slightly from one another in this position.

According to FIG. 1, a partition 9 is supplied to an auxiliary mandrel 6 at the station I, the partition 9 comprising lateral wings 10 which project from the auxiliary mandrel 6 on either side and are moulded onto the wall of the auxiliary mandrel 6 or in optionally provided recesses corresponding to the wings 10. At the next station II, a prefabricated tube body 11 is supplied and pushed axially onto the auxiliary mandrel 6 with the inserted partition 9 and the moulded-on wings 10.

It is also possible to wrap a cut-to-size piece for a tube body round the auxiliary mandrel 6 and to join, for example to weld, an overlapping edge or also, for example, to stick the lateral edges with a sealing tape.

At the subsequent station III, the wings 10 can if necessary be fastened tightly in the tube body, for example by high-frequency welding (the auxiliary mandrels having metal parts at the appropriate points for producing the welding heat in this case). If desired, welding can be carried out over the entire length of contact between tube body 11 and partition 9 or partition wings 10.

In the last station IV, the blank 12 consisting of tube body 11 with partition 9 produced in station III is transferred to the empty pressing mandrel 2 of the turntable 1 associated with this station in the axial position in each case. To allow the transfer, the auxiliary mandrels 6—at least in station IV—are associated with retractable applicators 13 (indicated schematically in FIG. 2). The applicator 13 has the object of transferring (applying) the blank 11 from the auxiliary mandrel 6 to the pressing mandrel 2, and this can also be associated with any auxiliary mandrel 6.

Preferably, the pressing mandrels 2—as described in DE 196 40 833, to which explicit reference will be made to avoid repetition—are also produced in two parts with a parting gap 14 in-between, the two mandrel parts 2a, b being longitudinally displaceable relative to one another.

The transfer takes place as shown in detail in FIG. 3. FIG. 3a shows the starting position in which a blank 12 is to be transferred from the auxiliary mandrel 6' to the pressing mandrel 2' aligned axially opposite with spacing. As shown particularly clearly in FIG. 3a, the lower auxiliary mandrel part 7' is provided with a recess 15 and the upper auxiliary mandrel part 7" with an insert 16 with a projecting nose 17. Insert 16 and nose 17 can also be formed integrally with the upper auxiliary mandrel part 7". The two auxiliary mandrel parts 7, 7" are bevelled in the entry region of the gap 8 and form a tapering "entry funnel" to allow easier entry of a partition 9 (see station I) into the gap 8. Prior to transfer of the blank 12 onto the pressing mandrel 2', the lower pressing mandrel part 2a is driven out or positioned into the recess 15 in the auxiliary mandrel 6', as shown in FIG. 3b, i.e. they are coupled to one another. The recess 15 is adapted in shape to the leading end of the pressing mandrel part 2a. This allows an exactly aligned coupled connection between auxiliary mandrel 6' and pressing mandrel 2'.

Figure 3A:
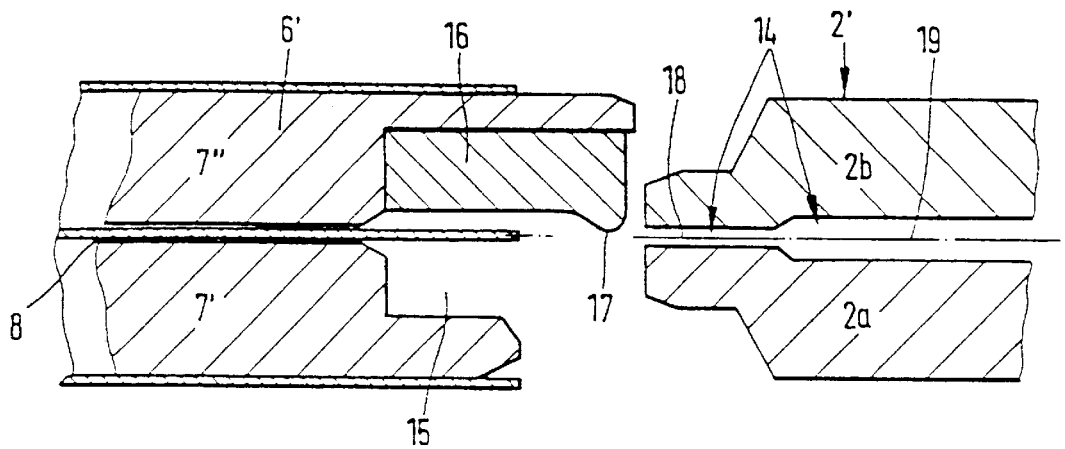
FIG. 3a shows a first stage of the passage of a prefabricated blank from an auxiliary mandrel onto a pressing mandrel.
Figure 3B:
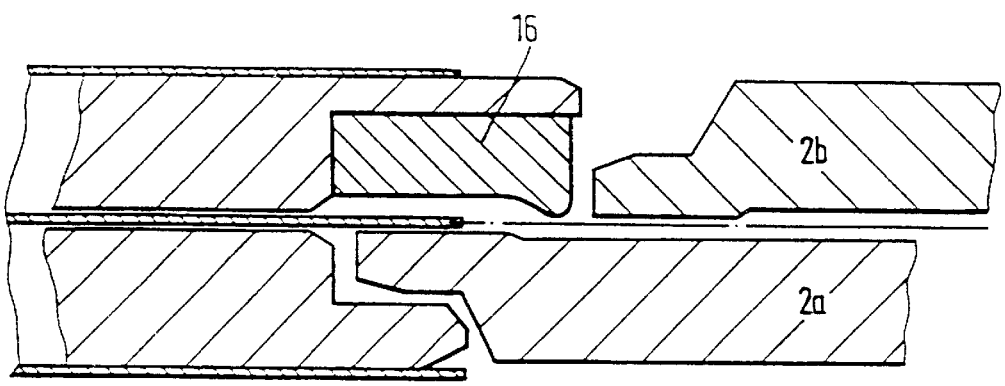
FIG. 3b shows a second stage of the passage of a prefabricated blank from an auxiliary mandrel onto a pressing mandrel.
Figure 3C:
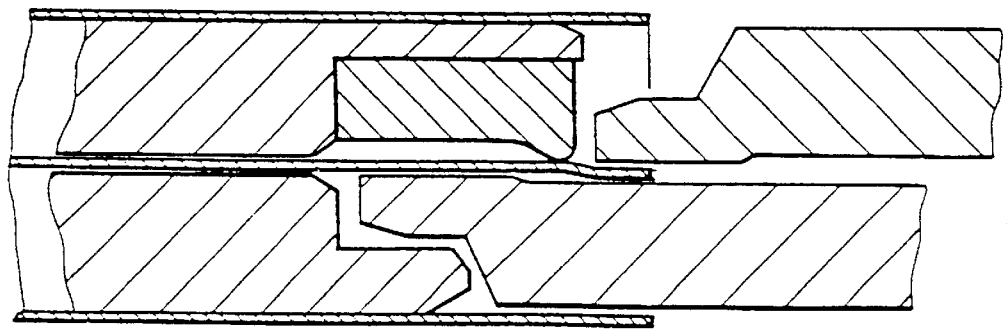
FIG. 3c shows a third stage of the passage of a prefabricated blank from an auxiliary mandrel onto a pressing mandrel.
Figure 3D:
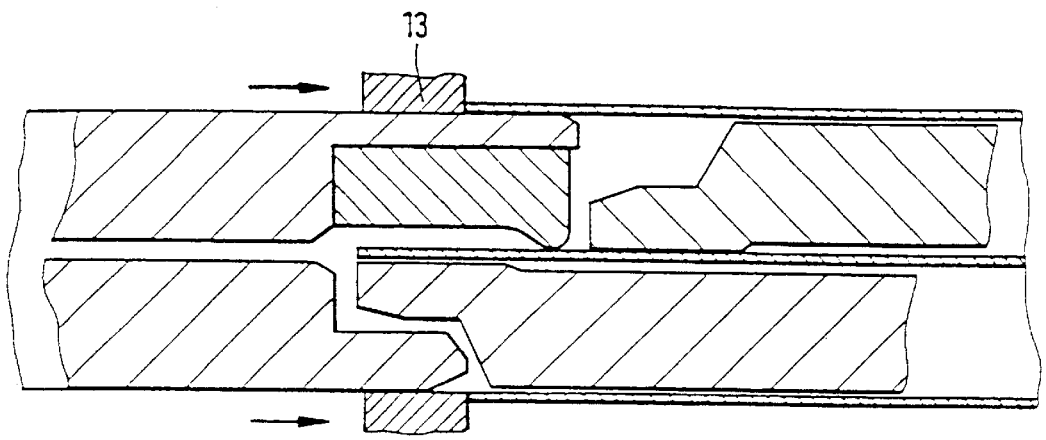
FIG. 3d shows a fourth stage of the passage of a prefabricated blank from an auxiliary mandrel onto a pressing mandrel.
Figure 3E:
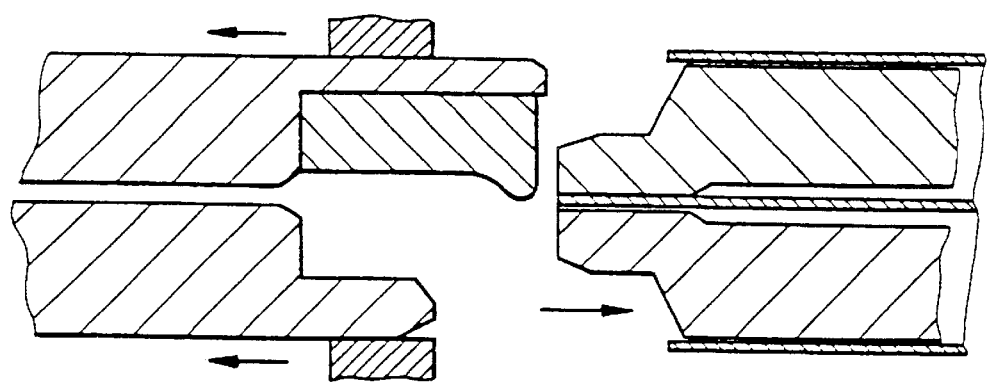
FIG. 3e shows a fifth stage of the passage of a prefabricated blank from a auxiliary mandrel onto a pressing mandrel.

As shown in FIG. 3a, the parting gap 14 in the pressing mandrel 2' consists of at least two portions, a leading narrow portion 18 and a trailing broader portion 19. The internal width of the leading narrow portion 18 corresponds roughly to the thickness of the partition 9 used. The advance of the lower part 2a of the pressing mandrel 2' (see FIG. 3b) not only allows coupling but also simplifies insertion into the parting gap 14. The coupling to the lower auxiliary mandrel part 7' and the enlargement of the entry gap achieved by the displacement (lifting of the narrow portion 18) as well as the guide nose 17 allow reliable, disturbance-free entry of the partition 9 of the blank 12 into the parting gap 14 of the pressing mandrel 2 (see FIG. 3c).

Transfer is effected by application of the blank 12 onto the pressing mandrel 2 by means of the applicator 13. To allow complete application of the blank 12 onto the pressing mandrel 2, the applicator 13 can be designed to travel out accordingly. However, it is also possible to end the application operation by the applicator 13 in the position shown in FIG. 3d and then to fix the blank 12 (the tube body 11) on the lower pressing mandrel part 2a, for example to load it with vacuum so that it is held securely and then to convey it into the position shown in FIG. 3e with the retraction of the pressing mandrel part 2a into its end position.

At an adjacent station or distributed over a plurality of stations on the turntable 1, a tube head is moulded on after the pressing mandrel 2' with the blank 12 has been pivoted into an axial position to a mould 3 and its insertion into the mould 3, and cooling and/or subsequent pressing may be carried out in further clocked positions. A retraction and then pivoting of the pressing mandrel 2 from the vertical position back into a horizontal position is also provided at a station, and the finished dual chamber tube can also be retracted from the pressing mandrel 2 at this station. If other operations, for example the screwing or pushing on of a closure cap, are proposed, a station can also be provided for this on the turntable 3. Individual steps can optionally also be distributed over a plurality of stations.

A hub 5 with four auxiliary mandrels 6 which are arranged at right angles to one another and are rotatable in a horizontal plane and a turntable 1 with eight pressing mandrels 2 uniformly distributed round the periphery is used in the embodiment, but any other desired number is also feasible, providing that the timing of the hub 5 and of the turntable 1 allows axial alignment of an auxiliary mandrel 6', equipped with a blank 12, with an empty pressing mandrel 2. Conveyors, for example chains or star wheels, on which the pressing mandrels are merely axially displaceably but not pivotally arranged and can be supplied to the individual transfer or processing stations, can also be provided instead of a turntable 1 with pivotal pressing mandrels 2.

What is claimed is:

1. A process for producing a dual chamber tube with a partition extending into the tube head and a prefabricated tube body which is produced by the following steps:
   a) inserting a partition into a gap between two separate parts of an auxiliary mandrel;
   b) applying a prefabricated tube body to said auxiliary mandrel;
   c) forming a blank by coupling said prefabricated tube body to said partition;
   d) conveying said blank from said auxiliary mandrel to a pressing mandrel wherein said pressing mandrel has two separate independently moveable parts with said blank being conveyed via the following steps:
      i) inserting a first pressing mandrel part into a gap in said auxiliary mandrel formed between said partition and said tube body;
      ii) pressing said blank onto said pressing mandrel, wherein said second pressing mandrel part is offset from said first pressing mandrel part via an insert disposed in an additional gap, formed opposite said gap between said partition and said tube body wherein when said blank is pressed on said pressing mandrel, wherein said insert has a nose that guides said partition into a gap between said first pressing mandrel part and said second pressing mandrel part;
   e) dispensing a molten portion of plastic material into a mold;
   f) inserting said pressing mandrel having said blank into said mold having said molten plastic material;
   g) molding a portion of said plastic material between said pressing mandrel and said mold to form a tube head while simultaneously producing a rigid connection of said tube head with said tube body and said partition via closure of said compression mold; and
   h) opening said compression mold and removing said pressing mandrel to extract a finished dual chamber tube.

2. The process as in claim 1, wherein said step of forming a blank comprises rigidly connecting a set of wings or longitudinal edges of said partition to said tube body.

3. The process as in claim 2, wherein said step of rigidly connecting includes welding along an entire length of contact between said tube body and said longitudinal edges or wings.

4. The process as in claim 1, wherein said step of molding said plastic occurs before said step of opening the compression mold.

5. The process as in claim 4, further comprising the step of cooling said plastic material after each subsequent pressing operation.

6. An apparatus for producing a dual chamber tube having a partition extending into a tube head and a prefabricated tube body comprising:

a) at least one mold for reproducing an external shape of a tube head;
b) at least one advanceable pressing mandrel having a portion for internal shape of a tube head, said pressing mandrel comprising at least two parts with each of said at least two parts being axially moveable independent of each other and spaced apart from each other by a gap;
c) at least one dispenser for discharging a portion of molten plastics into said at least one mold;
d) at least one auxiliary mandrel, comprising at least two mandrel parts being axially moveable independent of each other and spaced apart opposite each other by a gap for receiving a partition;
e) a loading device for supplying and inserting a said partition into said gap of said auxiliary mandrel;
f) a charging device for supplying and applying a prefabricated tube body to said auxiliary mandrel loaded with said partition, wherein said prefabricated tube body is coupled to said partition to form a blank;
g) at least one insert disposed adjacent to at least one of said parts of said auxiliary mandrel between said prefabricated partition and said prefabricated tube body;
g) at least one transfer device coupled to said auxiliary mandrel, for transferring said blank from said auxiliary mandrel to said pressing mandrel;
h) a device for conveying said pressing mandrel with said blank into said loaded mold for a molding of said tube head made of a portion of material onto said blank; and
i) an extractor for a finished tube;
wherein said apparatus is designed to perform the following steps:
  inserting said partition into said gap between said two separate auxiliary mandrel parts;
  applying said prefabricated tube body to said auxiliary mandrel;
  forming said blank by coupling said prefabricated tube body to said partition;
  conveying said blank from said auxiliary mandrel to said pressing mandrel which includes inserting said first pressing mandrel part into a gap in said auxiliary mandrel formed between said partition and said tube body; pressing said blank onto said pressing mandrel via said transfer device, wherein said second pressing mandrel part is offset from said first pressing mandrel part via said insert disposed in an additional gap, formed opposite said gap between said partition and said tube body wherein when said blank is pressed on said pressing mandrel, wherein said insert having a nose, guides said partition into a gap between said first pressing mandrel part and said second pressing mandrel part;
  dispensing a molten portion of plastic material into said mold;
  inserting said pressing mandrel having said blank into said mold having said molten plastic material;
  molding a portion of said plastic material between said pressing mandrel and said mold to form a tube head while simultaneously producing a rigid connection of said tube head with said tube body and said partition via closure of said compression mold; and
  opening said compression mold and removing said pressing mandrel to extract a finished dual chamber tube.

7. The apparatus as in claim 6, wherein said at least two auxiliary mandrel parts are arranged equidistant from each another on an intermittently rotatable hub.

8. The apparatus as in claim 7, wherein at least one of said at least two pressing mandrel parts is axially displaceable.

9. The apparatus as in claim 8, wherein each of said at least one auxiliary mandrel includes an adapted recess acting as a coupling to at least one of said at least two pressing mandrel parts.

10. The apparatus as in claim 9, wherein each of said at least one auxiliary mandrels has a guide projection in the form of said nose.

* * * * *